United States Patent
Buchter (10) Patent No.: US 11,054,523 B1
(45) Date of Patent: Jul. 6, 2021

(54) LIDAR WITH SIGNAL-RESONANCE RANGE ENHANCEMENT

(71) Applicant: Outsight SA, Paris (FR)

(72) Inventor: Scott Buchter, Espoo (FI)

(73) Assignee: Outsight SA, Paris (FR)

( * ) Notice: Subject to any disclaimer, the term of this patent is extended or adjusted under 35 U.S.C. 154(b) by 0 days.

(21) Appl. No.: 17/099,086

(22) Filed: Nov. 16, 2020

(51) Int. Cl.
*G01C 3/08* (2006.01)
*G01S 17/32* (2020.01)
*G01S 7/4913* (2020.01)
*G01S 7/4911* (2020.01)

(52) U.S. Cl.
CPC ............ *G01S 17/32* (2013.01); *G01S 7/4911* (2013.01); *G01S 7/4913* (2013.01)

(58) Field of Classification Search
CPC ....... G01S 17/32; G01S 7/4911; G01S 7/4913
See application file for complete search history.

(56) References Cited

U.S. PATENT DOCUMENTS

| | | | | |
|---|---|---|---|---|
| 6,269,108 | B1 * | 7/2001 | Tabirian | H01S 3/16 372/22 |
| 6,901,087 | B1 * | 5/2005 | Richardson | H01S 3/106 372/20 |
| 9,325,140 | B2 * | 4/2016 | Purnawirman | H01S 3/1636 |
| 10,101,600 | B2 | 10/2018 | Kryvobok | |
| 10,627,517 | B2 | 4/2020 | Yaacobi et al. | |
| 2019/0296521 | A1 * | 9/2019 | Yun | H01S 5/40 |

OTHER PUBLICATIONS

Hardy et al., "Remote gas leak detection using a portable mini-Lidar, based on a doubly-resonant OPO", Optical Society of America, 2011.

Jacquin et al., "Experimental comparison of autodyne and heterodyne laser interferometry using a Nd:YVO4 microchip laser", Journal of the Optical Society of America. A Optics, Image Science, and Vision, Optical Society of America, 2011, 28 (8), pp. 1741-1746. hal-00710190.

Kervevan et al., "Absolute distance measurement with heterodyne optical feedback on a Yb:Er glass laser", Applied Optics vol. 45, No. 17, pp. 4084-4091, Jun. 10, 2006.

(Continued)

*Primary Examiner* — Samantha K Nickerson
(74) *Attorney, Agent, or Firm* — Young Basile Hanlon & MacFarlane, P.C.

(57) ABSTRACT

A continuous-wave frequency-modulated (FMCW) LiDAR system comprises: a laser cavity around a solid gain medium; an optical source configured to optically pump the solid gain medium at a power that determines a relaxation oscillation frequency; a structure configured to apply force to the solid gain medium associated with a mechanical resonance frequency, wherein the relaxation oscillation frequency is equal to the mechanical resonance frequency within a factor of 5; an optical arrangement configured to transmit at least one optical beam from the laser cavity towards a target, and to couple into the laser cavity a received optical signal comprising at least a portion of the optical beam reflected from the target; and circuitry configured to determine at least one of an estimated distance to the target or a speed of motion of the target based at least in part on a signal from the laser cavity.

14 Claims, 6 Drawing Sheets

(56) References Cited

OTHER PUBLICATIONS

Minoni et al., "Wide-range distance meter based on frequency modulation of an Nd:YAG laser", Optical Engineering, vol. 35, No. 7, pp. 1949-1952, Jul. 1996.

Owyoung et al., "Stress-induced tuning of a diode-laser-excited monolithic Nd:YAG laser", Optics Letters, vol. 12, No. 12, pp. 999-1001, Dec. 1987.

Sandborn, "FMCW Lidar: Scaling to the Chip-Level and Improving Phase-Noise-Limited Performance", Electrical Engineering and Computer Sciences, University of California at Berkeley, Technical Report No. UCB/EECS-2019-148, http://www2.eecs.berkeley.edu/Pubs/TechRpts/2019/EECS-2019-148.html, Dec. 1, 2019.

Sjöholm et al., "Atomic mercury flux monitoring using an optical parametric oscillator based lidar system", Optics Express, vol. 12, No. 4, 551-556, Feb. 23, 2004.

Wagner, "Multi-frequency differential absorption LIDAR system for remote sensing of CO2 and H2O near 1.6 μm", Optics Express, vol. 26, No. 15, pp. 19420-19434, Jul. 23, 2018.

Zayhowski et al., "Frequency-modulated Nd:YAG microchip lasers", Optics Letters, vol. 14, No. 12, pp. 618-620, Jun. 15, 1989.

\* cited by examiner

LIDAR WITH SIGNAL-RESONANCE RANGE ENHANCEMENT

TECHNICAL FIELD

This disclosure generally relates to LiDAR systems, and more specifically, LiDAR systems with signal-resonance range enhancement.

BACKGROUND

Light detection and ranging (LiDAR) is a technology that can be used to estimate distances to remote targets. Typically, a LiDAR system includes a light source and an optical receiver. The light source emits an electromagnetic wave having a spectrum that has a peak wavelength that falls in a particular range of optical wavelengths (e.g., infrared, visible, or ultraviolet portions of the electromagnetic spectrum, including wavelengths between about 100 nm to about 1 mm, or some subrange thereof), also referred to as optical waves, light waves, or simply light. The LiDAR system emits light toward a target, which reflects some of the light, and some of the reflected light is received and directed to the optical receiver. As used herein, reflected light may include light that is reflected or scattered from the target by diffuse reflection, specular reflection, or any scattering mechanism that returns a portion of the light back to the LiDAR system, potentially including transmission through or additional scattering by other matter (e.g., rain drops) on the path to and/or from the target. The LiDAR system determines an estimated distance to the target based on one or more characteristics associated with an output of the optical receiver. For example, the LiDAR system may determine the estimated distance to the target based on the time for a pulse of light emitted by the light source to travel to the target and back to the LiDAR system for a time-of-flight (ToF) LiDAR system, or a frequency of the light reflected from the target for a frequency-modulated continuous-wave (FMCW) LiDAR system.

SUMMARY

In one aspect, in general, a continuous-wave frequency-modulated (FMCW) LiDAR system comprises: a laser cavity around a solid gain medium; an optical source configured to optically pump the solid gain medium at a power that determines a relaxation oscillation frequency; a structure configured to apply force to the solid gain medium associated with a mechanical resonance frequency, wherein the relaxation oscillation frequency is equal to the mechanical resonance frequency within a factor of 5; an optical arrangement configured to transmit at least one optical beam from the laser cavity towards a target, and to couple into the laser cavity a received optical signal comprising at least a portion of the optical beam reflected from the target; and circuitry configured to determine at least one of an estimated distance to the target or a speed of motion of the target based at least in part on a signal from the laser cavity.

In another aspect, in general, an apparatus for determining information associated with a target comprises: a laser cavity formed using at least two surfaces that are at least partially reflective and including a doped insulator gain medium; a structure configured to apply force to the doped insulator gain medium associated with a mechanical resonance frequency; an optical source configured to optically pump the doped insulator gain medium at a power that determines a relaxation oscillation frequency that is dependent on characteristics associated with the laser cavity, such that the relaxation oscillation frequency is equal to the mechanical resonance frequency within a factor of 5; an optical arrangement configured to: transmit at least one optical beam from the laser cavity towards the target, and couple into the laser cavity a received optical signal comprising at least a portion of the optical beam reflected from the target; and circuitry configured to determine at least one of an estimated distance to the target or a speed of motion of the target based at least in part on a frequency characteristic of at least a portion of an optical wave emitted from the doped insulator gain medium.

Aspects can include one or more of the following features.

The characteristics associated with the laser cavity comprise: an upper-state lifetime associated with the doped insulator gain medium, a round-trip cavity loss of the laser cavity, and a round-trip cavity length of the laser cavity.

The upper-state lifetime is at least 10 times greater than a cavity lifetime that is determined by the round-trip cavity loss and the round-trip cavity length.

The upper-state lifetime is greater than about 40 µs.

The at least two surfaces are surfaces of the doped insulator gain medium, and the structure comprises a transducer configured to apply force to the doped insulator gain medium to scan the round-trip cavity length.

The transducer is configured to scan the round-trip cavity length according to a signal whose spectrum includes a frequency that is equal to the mechanical resonance frequency within a factor of 5.

The transducer is configured to scan the round-trip cavity length to produce a beat frequency in a detected intensity of the portion of the optical wave emitted from the doped insulator gain medium such that the beat frequency is equal to the mechanical resonance frequency within a factor of 5.

The transducer comprises a piezoelectric transducer.

The optical wave emitted from the doped insulator gain medium is generated based at least in part on a circulating optical wave in the laser cavity that is perturbed by the optical signal coupled into the laser cavity.

The doped insulator gain medium comprises a crystal material, a glass material, or a ceramic material.

The doped insulator gain medium includes a dopant that comprises at least one of: rare earth ions, or transition metal ions.

The mechanical resonance frequency is between about A and B.

The optical source comprises a semiconductor laser.

The optical arrangement is configured to scan a transmission angle of the optical beam over a field of view.

In another aspect, in general, a method for determining information associated with a target comprises: modulating a frequency of a cavity mode of a laser cavity to produce a shift in optical frequency that is equal to a mechanical resonance frequency associated with a doped insulator gain medium within the laser cavity within a factor of 5; optically pumping the doped insulator gain medium at a power that determines a relaxation oscillation frequency that is dependent on characteristics associated with the laser cavity, such that the relaxation oscillation frequency is equal to the mechanical resonance frequency within a factor of 5; transmitting at least one optical beam from the laser cavity towards the target; coupling into the laser cavity a received optical signal comprising at least a portion of the optical beam reflected from the target; and determining at least one of an estimated distance to the target or a speed of motion of the target based at least in part on a frequency characteristic of at least a portion of an optical wave emitted from the doped insulator gain medium.

Aspects can include the following feature.

Modulating the frequency of the cavity mode of the laser cavity comprises scanning a round-trip cavity length of the laser cavity.

In another aspect, in general, a continuous-wave frequency-modulated (FMCW) LiDAR system comprises: a laser system comprising: a solid gain medium characterized by an upper-state lifetime greater than about 40 µs, an optical source configured to optically pump the solid gain medium at a predetermined optical pump power, a laser cavity around the solid gain medium characterized by round-trip cavity length defining a free spectral range that is large enough such that a single cavity mode is above a lasing threshold defined by the solid gain medium and the optical pump power, and a modulator configured to modulate a frequency of the single cavity mode over a predetermined frequency range, wherein the laser cavity includes at least one optical coupler configured to couple a transmitted optical wave from the laser system for transmission to a target and to couple a received optical wave from the target into the laser system; and circuitry configured to determine at least one of an estimated distance to the target or a speed of motion of the target based at least in part on a signal from the laser system.

Aspects can include one or more of the following features.

The modulator comprises circuitry configured to scan the round-trip cavity length such that the frequency of the single cavity mode is modulated over the predetermined frequency range while maintaining a single cavity mode above the lasing threshold.

The upper-state lifetime is greater than about 100 µs.

In another aspect, in general, an apparatus for determining information associated with a target comprises: a doped insulator gain medium; an array of optical sources configured to optically pump different non-overlapping portions of the doped insulator gain medium; an optical arrangement configured to: transmit a plurality of optical beams from the doped insulator gain medium towards the target; couple into the doped insulator gain medium received optical signals, where each optical signal comprises at least a portion of a respective one of the optical beams reflected from the target; and circuitry configured to determine at least one of an estimated distance to the target or a speed of motion of the target based at least in part on a frequency characteristic of at least a portion of one or more optical waves emitted from the doped insulator gain medium.

Aspects can include one or more of the following features.

The apparatus further comprises a transducer configured to apply force to the doped insulator gain medium to scan a round-trip cavity length of a laser cavity formed using the partially reflective surfaces of the doped insulator gain medium.

The transducer comprises a piezoelectric transducer.

The array of optical sources comprises an array of semiconductor lasers.

Aspects can have one or more of the following advantages.

In an FMCW LiDAR system, the frequency of light generated by the light source is modulated periodically such that the frequency increases substantially monotonically over a first time interval (e.g., according to an approximately linear ramp up) and decreases substantially monotonically over a second time interval (e.g., according to an approximately linear ramp down), which define a frequency chirp as a function of time (also called the "chirp function"). The optical receiver in some FMCW LiDAR systems includes an arrangement of optical elements that interferes the received light reflected from the target with a local oscillator derived from the light source. A beat frequency can be measured from the resulting interference pattern, which can be used to estimate the distance to the target and/or a speed of motion of the target relative to a frame of reference at the FMCW LiDAR system.

Some of the implementations of FMCW LiDAR systems described herein are able to mitigate certain potential limitations that may be experienced by FMCW LiDAR systems that use such external interference arrangements. For example, due to the number of optical elements used in some optical receivers and the potential difficulties in aligning and stabilizing the optical elements (e.g., bulk optical elements), and/or coupling light into the optical elements (e.g., integrated optical elements), the measured interference pattern can be noisy, making the beat frequency difficult to measure. Some of the techniques described herein are able to simplify the optical receiver system by coupling received light into the light source and using a portion of the light emitted from the light source to estimate the distance and/or relative speed of the target.

Additionally, techniques can be used to enhance the range that can be achieved in the LiDAR system. In some FMCW LiDAR systems, the light source is a laser that has an optical bandwidth (or "linewidth") that is relatively narrow in order to ensure that the generated light has a relatively long coherence time, which is inversely proportional to the laser's linewidth. The range of distances that can be estimated by a given FMCW LiDAR system is limited by the coherence time of the generated light (or coherence length obtained by multiplying the coherence time by the speed of light). Some of the techniques described herein can be used to form a FMCW LiDAR system that includes a compact and efficiently tunable laser system that uses a laser gain medium capable of achieving a narrow linewidth (e.g., a linewidth of around 100 kHz, or 10 kHz, or less). In some implementations, a maximum distance within the range of distances that can be estimated during normal operation of the system is enhanced due to one or more signal-resonance effects, as described in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
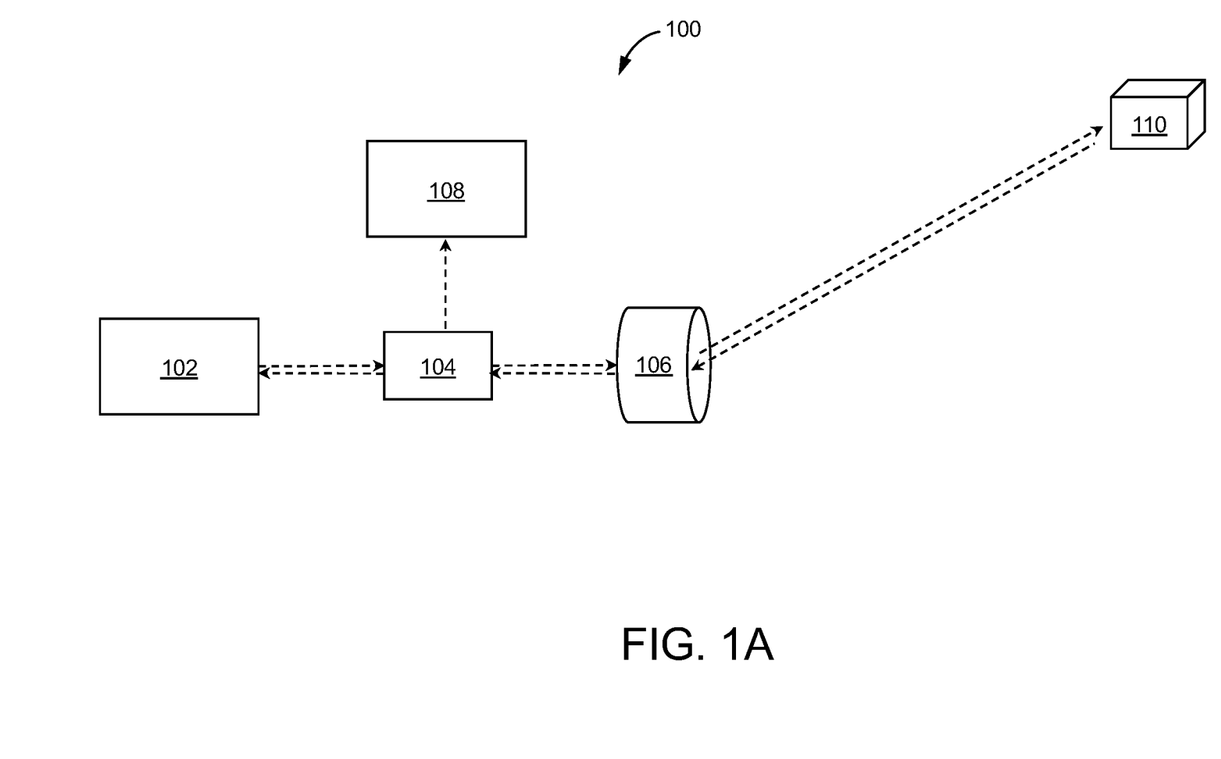
FIG. 1A is schematic diagram of an example FMCW LiDAR system.

Referring to FIG. 1A, an example FMCW LiDAR system 100 includes a laser system 102, an optical coupling module 104, an optical front-end module 106, and an estimation module 108. The laser system 102 provides an optical wave that has a chirped frequency that varies periodically between a minimum frequency and a maximum frequency. For example, in some cases the frequency varies over a frequency range that is a several GHz wide (e.g., 2 GHz, 5 GHz, 10 GHz, 20 GHz, or 50 GHz). The optical coupling module 104 sends a portion of the optical wave to the estimation module 106 and another portion of the optical wave to the front-end module 106. The front-end module 106 transmits the optical wave in the form of at least one optical beam towards a target 110 and receives a portion of the optical beam reflected from the target 110. For example, the front-end module 106 can include one or more lenses and/or other beam shaping optical elements. The optical coupling module 104 is also configured to couple at least a portion of the reflected light back into a laser cavity of the laser system 102, as explained in more detail below. Under certain operating conditions of the laser system 102, the FMCW LiDAR system is able to achieve signal-resonance range enhancement that is enabled by the coupling of the reflected light back into the laser cavity, as described in more detail below. The estimation module 108 uses the portion of the optical wave sent by the optical coupling module 104 to estimate a distance and/or speed of the target 110. In some implementations, the optical coupling module 104 is simply a beamsplitter (e.g., a 50/50 beamsplitter) that transmits a predetermined fraction of the optical power coming from either direction and reflects the remaining fraction of the optical power (less any negligible losses that may be imposed by the beamsplitter). The relatively simple configuration of modules of the FMCW LiDAR system 100 can be constructed using any of a variety of techniques including bulk optical components, integrated optical components, or a combination thereof.

The front end-module 106 is configured to form at least one optical beam from the optical wave and transmit the optical beam towards a target, if any target is present (e.g., target 110), within a field of view and distance range of the FMCW LiDAR system 100. The distance range defines a minimum and maximum distance over which light reflected from the target has sufficient power and coherence to enable a distance to the target to be estimated. The field of view corresponds to a certain solid angle over which a portion of the light reflected from the target can be collected at an aperture of the front-end module 106. In some implementations, the aperture at which a portion of the reflected light is collected is the same aperture that is used to transmit the optical beam towards the target. Additionally, essentially the same optical path can be traveled by the received light back through the optical coupling module 104 and into the laser system 102, but in the opposite direction, as the optical path traveled by the light sent from the laser system 102. This path overlap facilitates accurate optical alignment for high coupling efficiency.

In some implementations, the front-end module 106 includes a mechanism to cover multiple points within the solid angle covered by the field of view. For example, the front-end module 106 can include a raster scanner that scans the transmission angle of the optical beam over an array (e.g., a rectangular or circular array) of points with a predetermined dwell time at each point that is long enough to transmit and receive light to and from any target that is within the maximum distance. Any of a variety of scanning techniques can be used such as mechanical scanning actuators or steerable integrated optical phased arrays, for example. The front-end module 106 can also be configured to transmit multiple beams that are spread out over some or all of the field of view such that the FMCW LiDAR system 100 is able to concurrently estimate distances at each of multiple points in an array of points, as described in more detail below. Such a multi-beam output can also be scanned to further increase the field of view.

Figure 1B:
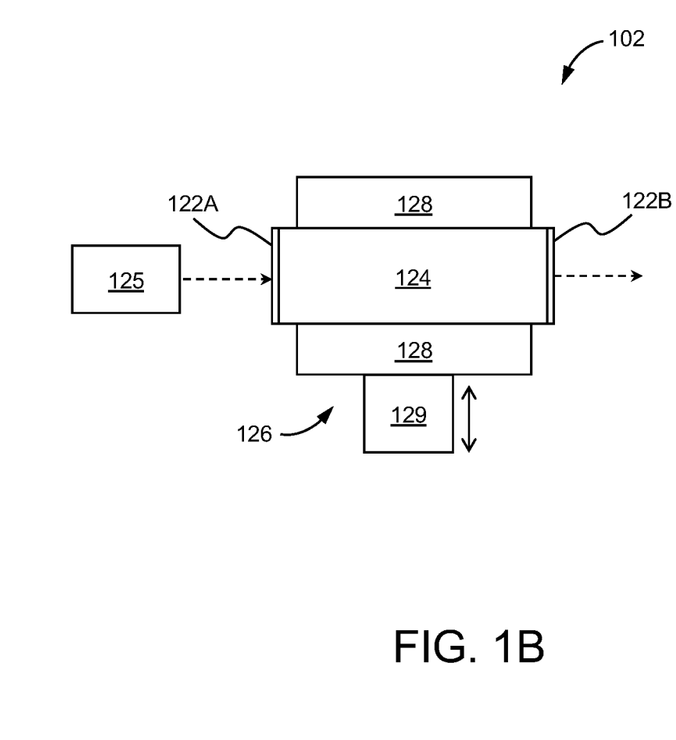
FIG. 1B is a schematic diagram of an example laser system.

One example implementation of the laser system 102 is shown in FIG. 1B. In this example, the laser system 102 includes a laser cavity 120 that is formed by applying at least partially reflective coatings 122A and 122B on opposite parallel end surfaces of a doped insulator gain medium 124. For example, the gain medium 124 can be composed of a solid material such as a crystal (e.g., yttrium aluminum garnet (YAG), yttrium vanadate ($YVO_4$), or yttrium lithium fluoride (YLF)) or a glass or ceramic material, which is doped with ions of a laser-active dopant (e.g., neodymium, ytterbium, erbium, chromium, titanium, or other trivalent rare earth ions or transition metal ions). The resulting doped insulator gain medium 124 when optically pumped with a pump light source 125 (e.g., a laser diode such as an edge emitter or a vertical-cavity surface-emitting laser (VCSEL)) at the appropriate wavelength (e.g., around 808 nm for Nd:YAG) is able to achieve a population inversion state that supports stimulated emission of radiation. For a given amount of pump power, the laser cavity 120 will be characterized by a lasing threshold, such that one or more cavity modes will be above the lasing threshold and the laser system 102 will produce a laser output at the frequency or frequencies of the lasing cavity mode(s). For single mode operation, the round-trip cavity length is small enough to produce a free spectral range that is large enough for only a single narrow-linewidth cavity mode to be above the lasing threshold at a time.

The linewidth of the laser system 102 is a function of the upper-state lifetime associated with the doped insulator gain medium 124, and the cavity finesse determined by the round-trip cavity loss of the laser cavity 120. In some implementations, the round-trip cavity loss is dominated by the amount of coupling out of, and into, the laser cavity 120 that occurs. For example, one coating 122A can be configured as a highly reflective coating with relatively low transmission (e.g., less than a tenth of a percent) at the output frequencies, and the other coating 122B can be a moderately-high reflective coating with a higher transmission (e.g., on the order of a few tenths of a percent or more) at the output frequencies. The lower-transmission coating 122A can also be configured as a dichroic coating that has a relatively high transmission at the frequency of the pump light source 125. The higher-transmission coating 122B can be configured to preserve a sufficiently high cavity finesse and also to provide an appropriate output coupling and input coupling. In some implementations, the input coupling, which is useful for providing feedback from the target 110, can be facilitated by avoiding any form of optical isolation at the output of the laser system 102 that is sometimes used in other laser systems. While a linewidth as narrow as around 1 kHz can be achieved with this type of solid-state gain medium, some implementations can achieve sufficient range of distances with a linewidth of around 5 kHz to provide a coherence length on the order of 20 km, which is sufficient for most LiDAR applications). In some operating environments there may be other physical limitations on the maximum distance that can be estimated, such as the absorption by the atmosphere.

The estimation module 108 includes circuitry that is configured to determine an estimated distance to the target and/or a speed of motion of the target based on a frequency characteristic of a portion of an optical wave emitted from the laser system 102, called a beat frequency $f_{beat}$ that results from the chirped output and received signal input coupling, as described in more detail below. This optical wave emitted from the laser has a spectrum that includes not only a peak frequency corresponding to the single lasing cavity mode, but also a spectral peak associated with the light that has been coupled back into the laser cavity from the target 110. There are complex laser dynamics that cause these spectral components to interact in a manner that results in a signal-resonance range enhancement, as described in more detail below (e.g., with reference to FIGS. 3A-3C).

The peak frequency of the single lasing cavity mode (or "lasing frequency") is changed over time in order to achieve the chirped output. The laser system 102 includes a cavity length modulation structure 126 that scans the round-trip cavity length between a minimum and maximum lengths such that the lasing frequency is scanned between the minimum and maximum frequencies ($f_{min}$ and $f_{max}$). For example, the cavity length modulation structure 126 can include a housing 128 that is configured to squeeze the sides of the doped insulator gain medium 124 such that there is a resulting change in its length between a compressed state and a rest state. The force that is applied to the doped insulator gain medium 124 by the housing 128 can be generated using a transducer 129, such as a piezoelectric transducer, that slides a movable wall of the housing to squeeze together at least two opposing surfaces of the doped insulator gain medium 124. The force results in a small change in length in the dimension transverse to the force. Any other kind of transducer can be used as long as the motion of the transducer 129 is able to be fast enough to achieve the desired chirp function waveform associated with the change in length as a function of time, and corresponding change in lasing frequency as a function of time. For example, the slope of the change in frequency per unit of time may be determined based on the maximum distance to be estimated. Depending on the shape of the chirp function waveform (e.g., a triangular shaped waveform), the spectrum of the signal used to modulate the cavity length will include a dominant modulation frequency $f_{mod}$ (e.g., a lowest order Fourier component of the spectrum). In some implementations, the laser system 102 is configured such that the modulation frequency $f_{mod}$ is close to a mechanical resonance frequency $f_{mech}$ associated with the doped insulator gain medium 124 and the housing 128 (e.g., a peak of a mechanical resonance spectrum that may include one or more frequency bands in which there is a significant mechanical resonance effect), as described in more detail below.

Figure 2A:
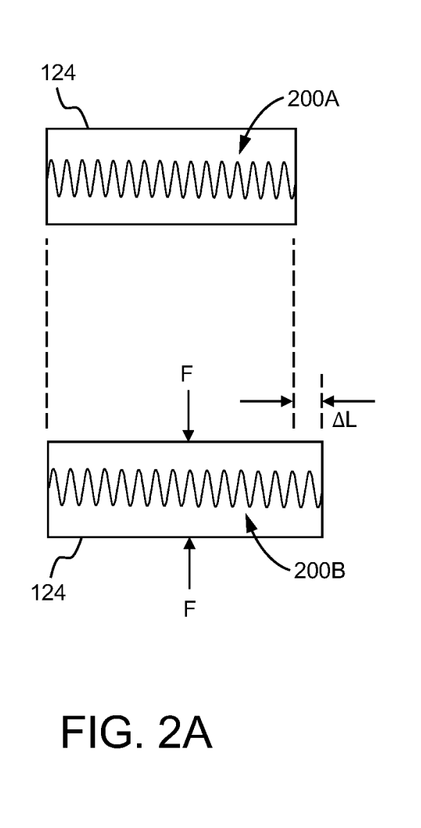
FIG. 2A is a schematic diagram of optical electric field patterns in a scanned laser cavity.

FIG. 2A shows an example (not to scale) of sinusoidal patterns 200A, 200B that represent the electric field amplitude of an optical wave whose wavelength allows the electric field to satisfy the boundary conditions between the reflective ends of the doped insulator gain medium 124. For the pattern 200A, the length of the laser cavity is at a minimum value when the cavity length modulation structure 126 is applying a minimum force to the sides of the doped insulator gain medium 124 (e.g., essentially no force). For the pattern 200B, the length of the laser cavity (and the corresponding round-trip cavity length) is at a maximum value when the cavity length modulation structure 126 is applying a maximum force F to the sides of the doped insulator gain medium 124, which results in the length expanding by ΔL relative to the length in the minimum force state. The frequency of the cavity mode that is above the lasing threshold changes continuously maintain an even number of half-periods of the electric field over the cavity length, or equivalently, an even number of periods of the electric field over a round trip as the length is scanned.

Figure 2B:
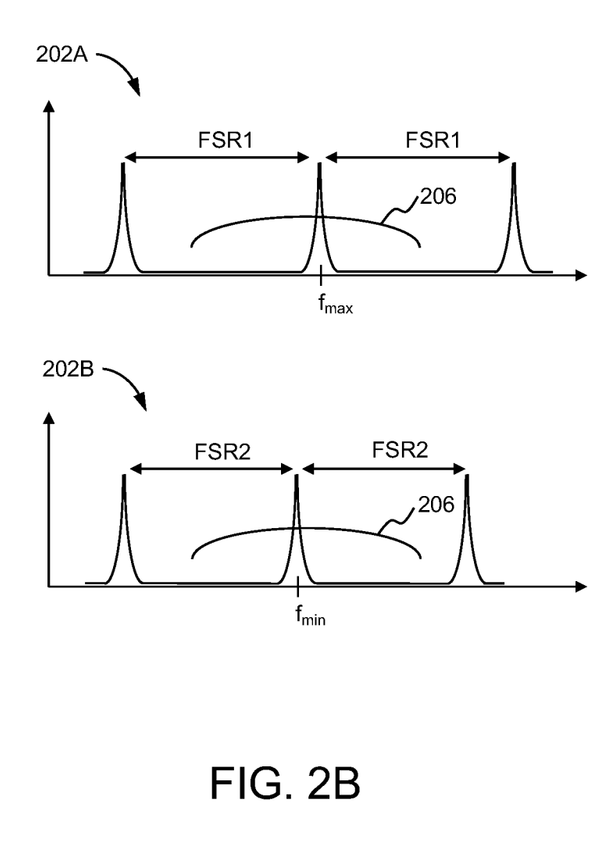
FIG. 2B are plots of optical spectra corresponding to the electric field patterns of FIG. 2A.

FIG. 2B shows the optical spectra 202A and 202B corresponding to the electric field patterns 200A and 200B, respectively, for the lasing cavity mode and non-lasing cavity modes on either side of the lasing cavity mode. Only a single cavity mode in each spectrum is able to lase since only a single cavity mode at the frequency $f_{max}$ at the center of the spectrum 202A, and a single cavity mode at the frequency $f_{min}$ at the center of the spectrum 202B, is within the central portion of the gain curve 206 of the laser. The separation between adjacent cavity modes defined by a resonant cavity around a laser gain medium is called the free spectral range (FSR) and is proportional to the inverse of the cavity length. The FSR changes slightly as the cavity length is scanned (i.e., a value of FSR1 for spectrum 202A and smaller value of FSR2 for spectrum 202B) but stays large enough to ensure single-mode lasing. Thus, the single-mode lasing condition, which enables a narrow linewidth output, can be maintained with a short enough cavity length. It doesn't take much of a change in length to produce a sufficient change in frequency for the chirp function. For example, in some implementations, for a value of ΔL of only around 1 nm, a change between $f_{min}$ and $f_{max}$ of hundreds of MHz can be achieved.

In some implementations, the chirp function is selected to be shaped approximately as a triangular wave with an approximately monotonic ramp up followed by an approximately monotonic ramp down of approximately the same time duration as the ramp up. Due to complex dynamics in the mechanical actuation and/or the laser operation, the slope of the chirp function may be approximately, but not necessarily perfectly, linear during the ramp up and ramp down. The slope of the chirp function (i.e., γ measured in Hz/s) can be used to estimate the time delay, and therefore the estimated distance, that corresponds to a particular frequency shift between transmitted and received light from a target. The estimated distance d to a target can be computed as a function of a measured beat frequency that corresponds to that frequency shift according to:

$$d = c \frac{f_{beat}}{2\gamma}$$

where c is the speed of light, and $f_{beat}$ is the frequency of the periodic intensity fluctuation (or "beat") that results from the mixing of two optical frequencies at a square-law detector such as a photodetector. The speed of relative motion between the FMCW LiDAR system 100 and the target 110 can be estimated by comparing the measured beat frequency $f_{beat}$ at corresponding times during the upward sloping portion of the chirp function and the downward sloping portion of the chirp function. To measure the beat frequency $f_{beat}$ the estimation module 108 includes a detector 130, such as a PIN photodiode for a single-beam configuration, or a photodiode array for measuring multiple beat frequencies in a multi-beam configuration. The estimation module 108 also includes circuitry 132 (e.g., analog, and/or digital circuitry) for extracting information such as the beat frequency from the detector signal and performing appropriate computations for calculating the distance, speed, or other information about the target 110.

Figure 3A:
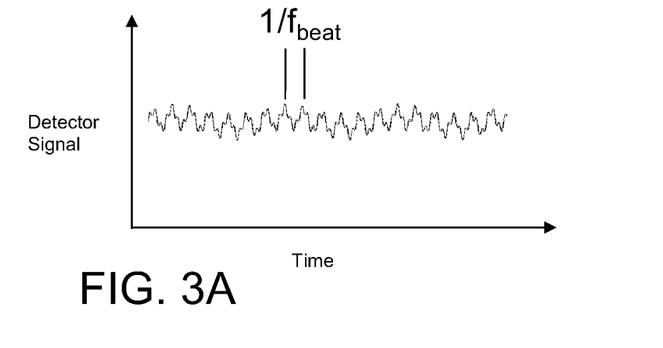
FIGS. 3A, 3B, and 3C are plots of example detector signals under different operating conditions.
Figure 3B:
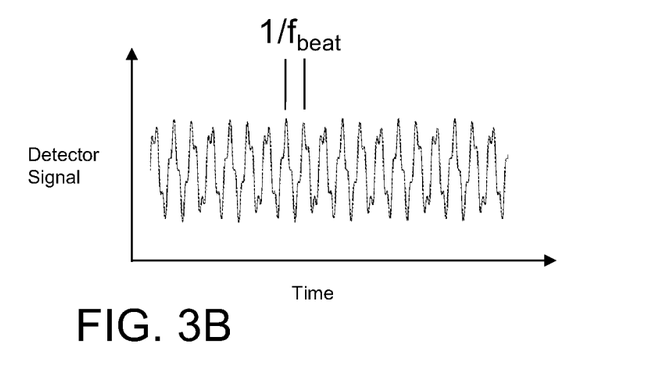
Figure 3C:
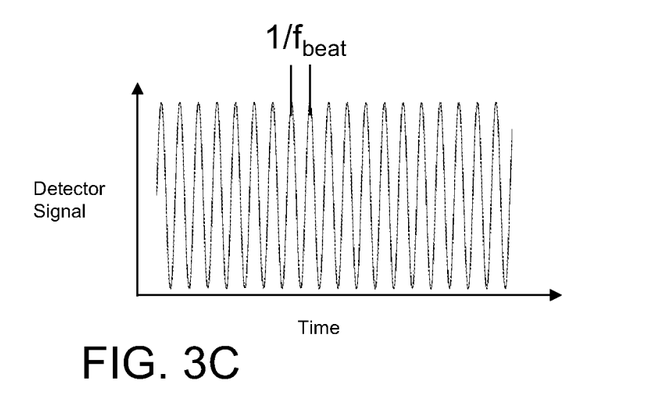

FIGS. 3A, 3B, and 3C show examples of detector signal intensities as a function of time that would occur under various operating conditions of the laser system 102 when the received light reflected from the target 110 is coupled back into the laser cavity 120. In these examples, it is assumed that the FMCW LiDAR system 100 is operating near the far end of the range of distances that can be estimated (e.g., when the round-trip distance to the target approaches the laser coherence length), where the beat frequency could potentially be difficult to detect. Certain forms of resonance can be used to enhance the signal strength at the beat frequency. There is one form of resonance that is associated with the structural mechanical oscillation dynamics of the cavity length modulation structure 126 and the doped insulator gain medium 124 (e.g., an acoustic resonance of the crystal, glass, ceramic, or other material from which the doped insulator gain medium 124 was formed). This form of resonance is characterized by a mechanical resonance frequency $f_{mech}$, which may have a value of around a few MHz for a Nd:YAG crystal. This mechanical resonance allows the cavity length modulation structure 126 to be operated in a more energy-efficient manner (e.g., using a lower transducer driving voltage), and/or allows a larger modulation depth to be achieved. In the examples shown in FIGS. 3A, 3B and 3C, it is assumed that the cavity length modulation frequency is relatively close to this mechanical resonance frequency, but there are also other forms of resonance (as illustrated in FIGS. 3B and 3C) that can be used to enhance the signal strength at the beat frequency even if the cavity length modulation is not particularly close to this mechanical resonance frequency.

FIG. 3A shows an example of the beat period (i.e., the inverse of the beat frequency) that is discernable in a beat signal associated with the detector intensity when the cavity length modulation is relatively close to the mechanical resonance or close enough to be within the bandwidth of a resonance peak (e.g., $f_{mod} \approx f_{mech}$ within a factor of 1.2, 1.5, 2, or 5, which in some cases depends on the specific resonance behavior), but when certain other characteristic frequencies are not close to each other. In addition to the beat frequency $f_{beat}$ and the mechanical resonance frequency $f_{mech}$, there is another characteristic frequency associated with the laser system 102 that has a potentially significant effect on the detector intensity. A relaxation oscillation frequency $f_{rel}$ is associated with the internal laser dynamics of the laser cavity 120, including oscillations that occur when a laser is perturbed out of equilibrium. The relaxation oscillation frequency is a function of the pump power level, the upper-state lifetime of the doped insulator gain medium 124, and the cavity lifetime. The cavity lifetime is a function of the round-trip cavity loss of the laser cavity 120 (including output coupling losses), and the round-trip optical length of the laser cavity 120. When these three frequencies are relatively far from each other (e.g., $f_{beat} \not\approx f_{mech} \not\approx f_{rel}$), there may be a limited signal-resonance range enhancement effect, but there still may be a significant amount of noise that has the potential to reduce the fidelity of the detection of the beat frequency.

FIG. 3B shows an example of the beat signal when the beat frequency near the end of the distance range is designed to be relatively close to the mechanical resonance frequency or close enough to be within the bandwidth of a resonance peak (e.g., within a factor of 1.2, 1.5, 2, or 5, which in some cases depends on the specific resonance behavior), but not particularly close to the relaxation oscillation frequency. By configuring the geometry of the doped insulator gain medium 124, the mechanical characteristics of the housing 128, and the frequency span of the chirp function ($f_{max}$, $f_{min}$), this condition ($f_{beat} \approx f_{mech}$) can be achieved near the end of the distance range. Under these operating conditions, the beat signal is enhanced, leading to a larger signal-resonance range enhancement effect and a higher fidelity of the detection of the beat frequency.

FIG. 3C shows an example of the beat signal when the beat frequency near the end of the distance range is designed to be relatively close to the relaxation oscillation frequency or close enough to be within the bandwidth of a resonance peak (e.g., within a factor of 1.2, 1.5, 2, or 5, which in some cases depends on the specific resonance behavior). Under these operating conditions ($f_{beat} \approx f_{mech} \approx f_{rel}$), the beat signal is further enhanced, leading to an even higher fidelity of the detection of the beat frequency. The synergistic effect of configuring mechanical resonance frequency to be close to the relaxation oscillation frequency provides a larger distance range than would otherwise be achievable based on the coherence length of the laser system 102. In some implementations, it may help if these three frequencies are not exactly equal to each other so that the dynamic effects inside the laser cavity are not so extreme that it leads to instability. In addition to, or instead of, the enhanced range that can be achieved due to one or more of the resonances, power savings can also be achieved in operating the laser system 102.

Other implementations can use other forms of signal enhancement. For example, the beat frequency near the end of the distance range can be relatively close to the relaxation oscillation frequency, but not particularly close to the mechanical resonance frequency. For such implementations in which the enhancement due to the relaxation oscillations is sufficient to provide a sufficient level of signal-resonance range enhancement, other techniques may be used to achieve the frequency chirp. For example, the lasing frequency can be tuned by an intra-cavity (i.e., positioned inside the laser cavity 120) electro-optic modulator that modulates the refractive index of the doped insulator gain medium 124 instead of by scanning the cavity length. Alternatively, an extra-cavity (i.e., positioned outside the laser cavity 120) electro-optic or acousto-optic modulator can be used to modulate the optical wave emitted from the laser cavity 120.

The estimation module 108 also includes circuitry configured to perform these distance and speed estimation computations according to appropriate timing with respect to characteristics of the chirp function (e.g., the slope y, and the peak-to-peak amplitude, the period, and/or the timing of the peaks). The estimation module 108 can also be configured to communicate with and/or share information with the front-end module 106 to ensure the timing is appropriate for the dwell time at each point being captured within the field of view. For example, there may be 1 period of the chirp function per point in the field of view.

Figure 4:
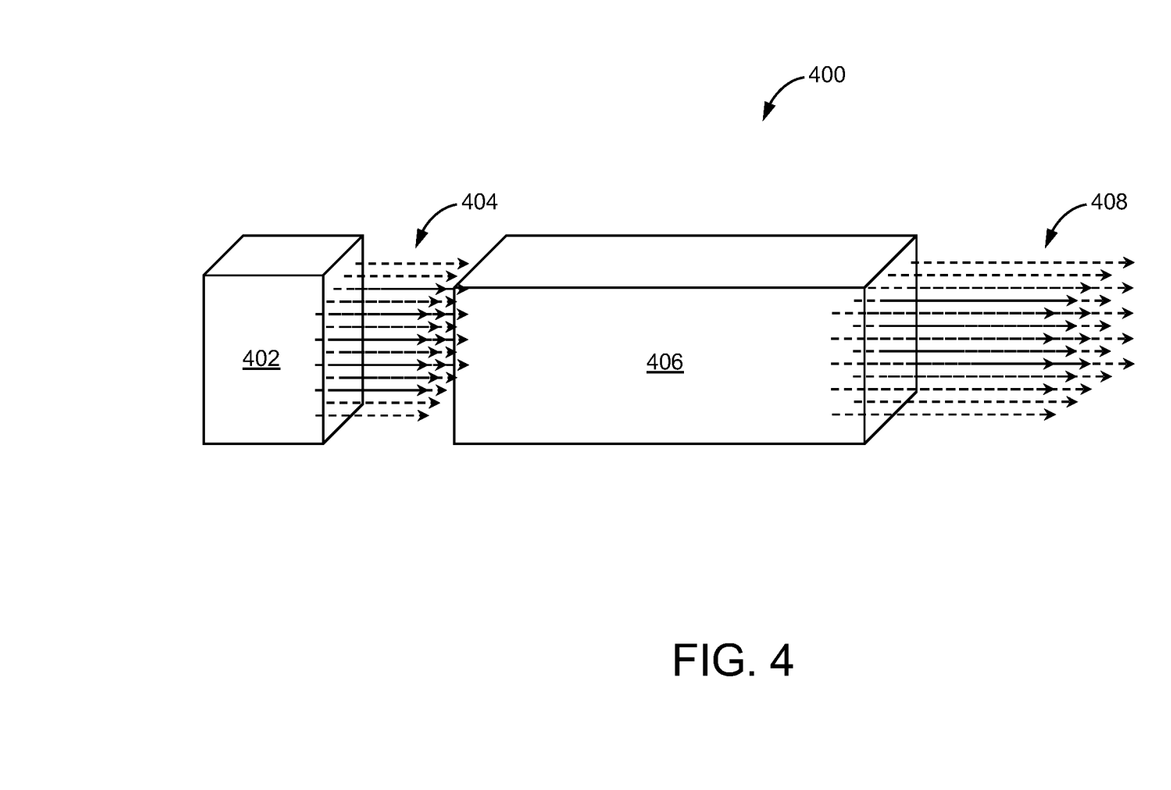
FIG. 4 is a schematic diagram of an example multi-laser light source.

Some implementations of the FMCW LiDAR system 100 use multiple beams to concurrently estimate distances at multiple points, as mentioned above. To illustrate one way to achieve this multi-beam configuration, a different implementation of the laser system 102 is shown as a laser system 400 in FIG. 4. A multi-beam pump light source 402 provides multiple non-overlapping pump beams 404. For example, the pump light source 402 can be implemented using an array of laser diodes (e.g., an array of edge emitters or VCSELs), or using a single laser diode whose output beam is sent through a diffractive optical element (e.g., an optical element that has a microstructure surface configured to produce a two-dimensional array of diffracted beams). In some implementations, an array of optical fibers (e.g., in a fiber bundle) can be used to deliver the pump beams 404. A single doped insulator gain medium 406 receives the pump beams 404 to achieve population inversion for lasing, as described above for the single-beam configuration. There is also a cavity length modulation structure (not shown) for providing a chirped frequency output. By ensuring the pump beams 404 are sufficiently separated in the transverse spatial dimension (i.e., the plane orthogonal to the propagation axes of the beams) a set of independent lasers will be formed in the doped insulator gain medium 406 with minimal crosstalk. The resulting output beams 408 from the laser system 400 can also be relatively well collimated over the rest of the FMCW laser system to share common optical elements of an optical coupling module and an optical front-end module for the multi-beam configuration. In some implementations, the multiple lasers can also have an offset in their lasing frequencies to further reduce any residual crosstalk among the different lasers. For example, inside the laser cavity there can be a wedge-shaped optical element that has surfaces that are anti-reflection coated and non-parallel so that there is a slightly different optical path length and thus a different lasing frequency for each laser.

Figure 5:
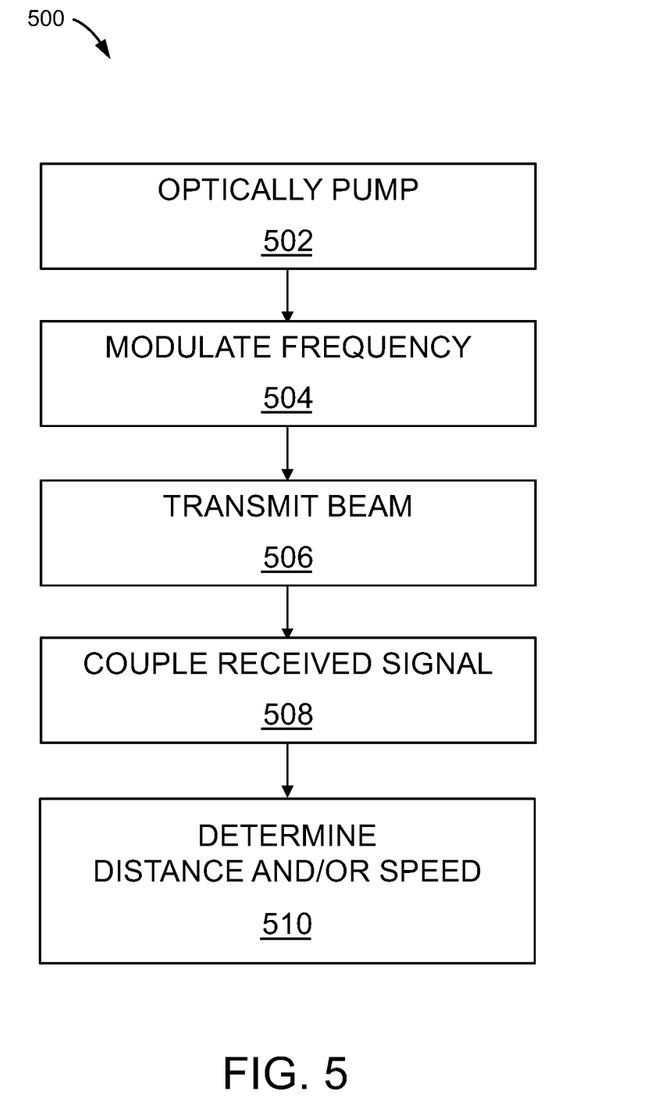
FIG. 5 is a flowchart of an example procedure for operating a LiDAR system.

Referring to FIG. 5, an example procedure 500 for operating a LiDAR system includes optically pumping (502) the doped insulator gain medium. The procedure 500 also includes modulating (504) a frequency of a cavity mode of a laser cavity to produce a shift in optical frequency that is equal to a mechanical resonance frequency associated with the doped insulator gain medium within the laser cavity within a factor of 5 (or a factor of 2, or 1.5). Thus, the beat frequency near the maximum distance of the range will be close to the mechanical resonance frequency. The doped insulator gain medium is pumped at a power that determines a relaxation oscillation frequency that is dependent on characteristics associated with the laser cavity, such that the relaxation oscillation frequency is equal to the mechanical resonance frequency within a factor of 5 (or a factor of 2, or 1.5). The procedure 500 also includes transmitting (506) at least one optical beam from the laser cavity towards the target. The procedure 500 also includes coupling (508) into the laser cavity a received optical signal comprising at least a portion of the optical beam reflected from the target. The procedure 500 also includes determining (510) at least one of an estimated distance to the target or a speed of motion of the target based at least in part on a frequency characteristic of at least a portion of an optical wave emitted from the doped insulator gain medium.

While certain techniques have been used in some of the example implementations described herein, other techniques are possible. For example, instead of a linear (or standing wave) cavity with two reflective surfaces on opposing sides of the laser gain medium there can be more reflective surfaces forming a ring cavity. Also, one or more of the reflective surfaces can be on another element with one or more surfaces of the laser gain medium having an anti-reflective coating. In some implementations, instead of scanning the round-trip cavity length by modulating the length of the laser gain medium, reflective surface on another element can be modulated (e.g., using a piezoelectric transducer). Though, for some implementations, there may be advantages to using a linear cavity with two opposing reflective surfaces on the laser gain medium (e.g., for a compact and stable laser cavity design).

The LiDAR techniques described herein can be useful in any of a variety of fields, with parameters adjusted to provide an appropriate distance range, including applications within the following fields: medical (very short range), automotive (medium range), smartphones (short range), astronomy/cartography (very long range), VR/AR applications (short/medium range).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for determining information associated with a target, comprising:
   a laser cavity formed using at least two surfaces that are at least partially reflective and including a doped insulator gain medium;
   a structure configured to apply force to the doped insulator gain medium associated with a mechanical resonance frequency;
   an optical source configured to optically pump the doped insulator gain medium at a power that determines a relaxation oscillation frequency that is dependent on characteristics associated with the laser cavity, such that the relaxation oscillation frequency is equal to the mechanical resonance frequency within a factor of 5;
   an optical arrangement configured to:
     transmit at least one optical beam from the laser cavity towards the target, and
     couple into the laser cavity a received optical signal comprising at least a portion of the optical beam reflected from the target; and
   circuitry configured to determine at least one of an estimated distance to the target or a speed of motion of the target based at least in part on a frequency characteristic of at least a portion of an optical wave emitted from the doped insulator gain medium.

2. The apparatus of claim 1, wherein the characteristics associated with the laser cavity comprise:
   an upper-state lifetime associated with the doped insulator gain medium,
   a round-trip cavity loss of the laser cavity, and
   a round-trip cavity length of the laser cavity.

3. The apparatus of claim 2, wherein the upper-state lifetime is at least 10 times greater than a cavity lifetime that is determined by the round-trip cavity loss and the round-trip cavity length.

4. The apparatus of claim 2, wherein the upper-state lifetime is greater than about 40 μs.

5. The apparatus of claim 1, wherein the at least two surfaces are surfaces of the doped insulator gain medium, and the structure comprises a transducer configured to apply force to the doped insulator gain medium to scan the round-trip cavity length.

6. The apparatus of claim 5, wherein the transducer is configured to scan the round-trip cavity length according to a signal whose spectrum includes a frequency that is equal to the mechanical resonance frequency within a factor of 5.

7. The apparatus of claim 5, wherein the transducer is configured to scan the round-trip cavity length to produce a beat frequency in a detected intensity of the portion of the optical wave emitted from the doped insulator gain medium such that the beat frequency is equal to the mechanical resonance frequency within a factor of 5.

8. The apparatus of claim 5, wherein the transducer comprises a piezoelectric transducer.

9. The apparatus of claim 1, wherein the optical wave emitted from the doped insulator gain medium is generated based at least in part on a circulating optical wave in the laser cavity that is perturbed by the optical signal coupled into the laser cavity.

10. The apparatus of claim 1, wherein the doped insulator gain medium comprises a crystal material, a glass material, or a ceramic material.

11. The apparatus of claim 10, wherein the doped insulator gain medium includes a dopant that comprises at least one of: rare earth ions, or transition metal ions.

12. The apparatus of claim 1, wherein the mechanical resonance frequency is between about 1 MHz and 10 MHz.

13. The apparatus of claim 1, wherein the optical source comprises a semiconductor laser.

14. The apparatus of claim 1, wherein the optical arrangement is configured to scan a transmission angle of the optical beam over a field of view.

* * * * *